(12) United States Patent
Schade

(10) Patent No.: US 8,979,063 B2
(45) Date of Patent: Mar. 17, 2015

(54) FAILSAFE APPARATUS FOR USE WITH LINEAR ACTUATORS

(75) Inventor: Ross Arthur Schade, Ames, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 116 days.

(21) Appl. No.: 13/305,115

(22) Filed: Nov. 28, 2011

(65) Prior Publication Data

US 2013/0134333 A1   May 30, 2013

(51) Int. Cl.
*F16K 31/72* (2006.01)
*F16K 31/44* (2006.01)

(52) U.S. Cl.
USPC .............. 251/69; 251/68; 251/72; 251/74

(58) Field of Classification Search
USPC ............ 251/68, 69, 72, 74, 101, 107, 109
See application file for complete search history.

(56) References Cited

U.S. PATENT DOCUMENTS

| | | | |
|---|---|---|---|
| 981,087 A | | 1/1911 | Hoyt |
| 1,477,641 A | * | 12/1923 | Francis ........................ 251/75 |
| 1,641,892 A | | 9/1927 | Lane |
| 1,679,898 A | | 8/1928 | Gilbert |
| 1,712,298 A | | 5/1929 | Ford |
| 2,276,195 A | * | 3/1942 | Holmes .................. 137/624.11 |
| 2,321,095 A | * | 6/1943 | Mantz ............................ 137/66 |
| 2,598,062 A | | 5/1952 | Krecan |
| 2,630,832 A | * | 3/1953 | Otto ............................. 251/69 |
| 3,015,337 A | * | 1/1962 | Hookway ...................... 137/75 |
| 3,292,895 A | | 12/1966 | Leger et al. |
| 3,534,770 A | | 10/1970 | Kowalski |
| 4,151,979 A | | 5/1979 | Visalli |
| 4,208,032 A | * | 6/1980 | Mineur ......................... 251/69 |
| 4,245,814 A | * | 1/1981 | Shimizu ........................ 251/65 |
| 4,364,541 A | | 12/1982 | Chabat-Courrede et al. |
| 4,794,309 A | | 12/1988 | Saito et al. |
| 4,836,497 A | | 6/1989 | Beeson |
| 5,101,939 A | * | 4/1992 | Sheridan ..................... 188/171 |

(Continued)

FOREIGN PATENT DOCUMENTS

| | | |
|---|---|---|
| EP | 1473496 | 11/2004 |
| JP | 04165172 | 6/1992 |

(Continued)

OTHER PUBLICATIONS

Beck, "Electric Actuators for Industrial Process Control," Feb. 2005, 8 pages.

(Continued)

*Primary Examiner* — John K Fristoe, Jr.
*Assistant Examiner* — Daphne M Barry
(74) *Attorney, Agent, or Firm* — Hanley, Flight & Zimmerman, LLC

(57) ABSTRACT

Failsafe apparatus for use with linear actuators are disclosed. A failsafe apparatus for use with a linear actuator includes a spring to urge a first stem of a device to be operated by the linear actuator toward a failsafe position and a clutch to operatively couple a second stem of the linear actuator to the first stem. The clutch includes a frame coupled to one of the first stem or the second stem and jaws moveably coupled to the frame. The jaws are to engage the other one of the first stem or the second stem to enable the linear actuator to operate the device and to disengage the other one of the first stem or the second stem to enable the spring to move the first stem toward the failsafe position.

20 Claims, 5 Drawing Sheets

(56) References Cited

U.S. PATENT DOCUMENTS

| | | |
|---|---|---|
| 5,318,272 A | 6/1994 | Smith |
| 5,343,884 A * | 9/1994 | Henderson et al. ............. 137/77 |
| 5,518,462 A | 5/1996 | Yach |
| 5,950,668 A | 9/1999 | Baumann |
| 6,045,015 A * | 4/2000 | Waltenspuhl et al. ........ 222/600 |
| 6,182,678 B1 | 2/2001 | Ma et al. |
| 6,371,162 B1 | 4/2002 | Groeneveld |
| 6,471,182 B1 | 10/2002 | McIntosh |
| 6,488,260 B1 | 12/2002 | Dietz |
| 6,561,480 B1 | 5/2003 | Komiya et al. |
| 6,769,665 B2 | 8/2004 | Silva et al. |
| 6,997,430 B2 | 2/2006 | Denning et al. |
| 8,308,129 B2 * | 11/2012 | Strange et al. .................. 251/69 |
| 8,636,262 B2 | 1/2014 | Schade et al. |
| 2010/0133454 A1 * | 6/2010 | Strange et al. ........... 251/129.01 |

FOREIGN PATENT DOCUMENTS

| | | |
|---|---|---|
| JP | 2003130235 | 5/2003 |
| WO | 9514186 | 5/1995 |

OTHER PUBLICATIONS

Emerson Process Management, "Baumann Electronic Modulating Actuators," Product Bulletin, May 2009, 8 pages.
Emerson Process Management, "Baumann NV Electric Actuator Instructions," Instruction Manual, May 2009, 12 pages.
Woodward, "GVP-100 Gas Control Valve," 2004, 16 pages.

* cited by examiner

FAILSAFE APPARATUS FOR USE WITH LINEAR ACTUATORS

FIELD OF THE DISCLOSURE

This disclosure relates generally to linear actuators and, more particularly, to failsafe apparatus for use with linear actuators.

BACKGROUND

Electric linear actuators are often used to operate devices such as flow control members in valves. Typically, a stem of a linear actuator is coupled to a stem of a device such as a valve. If the linear actuator loses electrical power, the linear actuator may maintain its last position and hold the stem of the device in an undesirable position. Backup power systems may be used to drive a motor of the linear actuator to move the stem of the device to a failsafe position. However, these backup power systems can fail without notice, have temperature limitations, and create ignition hazards.

SUMMARY

An example failsafe apparatus for use with a linear actuator includes a frame coupled to one of a first stem of a device to be operated by the linear actuator or a second stem of the linear actuator. The example failsafe apparatus further includes a first jaw and a second jaw. Each jaw is moveably coupled to the frame, and the jaws are to engage or disengage the other one of the first stem or the second stem. A spring is to urge the first stem toward a failsafe position. The spring moves the first stem toward the failsafe position when the jaws disengage the other one of the first stem or the second stem.

Another example failsafe apparatus for use with a linear actuator includes a spring to urge a first stem of a device to be operated by the linear actuator toward a failsafe position and a clutch to operatively couple a second stem of the linear actuator to the first stem. The clutch includes a frame coupled to one of the first stem or the second stem and jaws moveably coupled to the frame. The jaws are to engage the other one of the first stem or the second stem to enable the linear actuator to operate the device and to disengage the other one of the first stem or the second stem to enable the spring to move the first stem toward the failsafe position.

Another example failsafe apparatus for use with a linear actuator includes means for urging a first stem of a device to be operated by the linear actuator toward a failsafe position. The example failsafe apparatus also includes means for operatively coupling a second stem of the linear actuator to the first stem. The means for operatively coupling includes means for supporting means for engaging. The means for supporting is coupled to one of the first stem or the second stem. The means for engaging are to engage the other one of the first stem or the second stem to enable the linear actuator to operate the device and to disengage the second stem to enable the means for urging to move the first stem toward the failsafe position.

DETAILED DESCRIPTION

Figure 1:
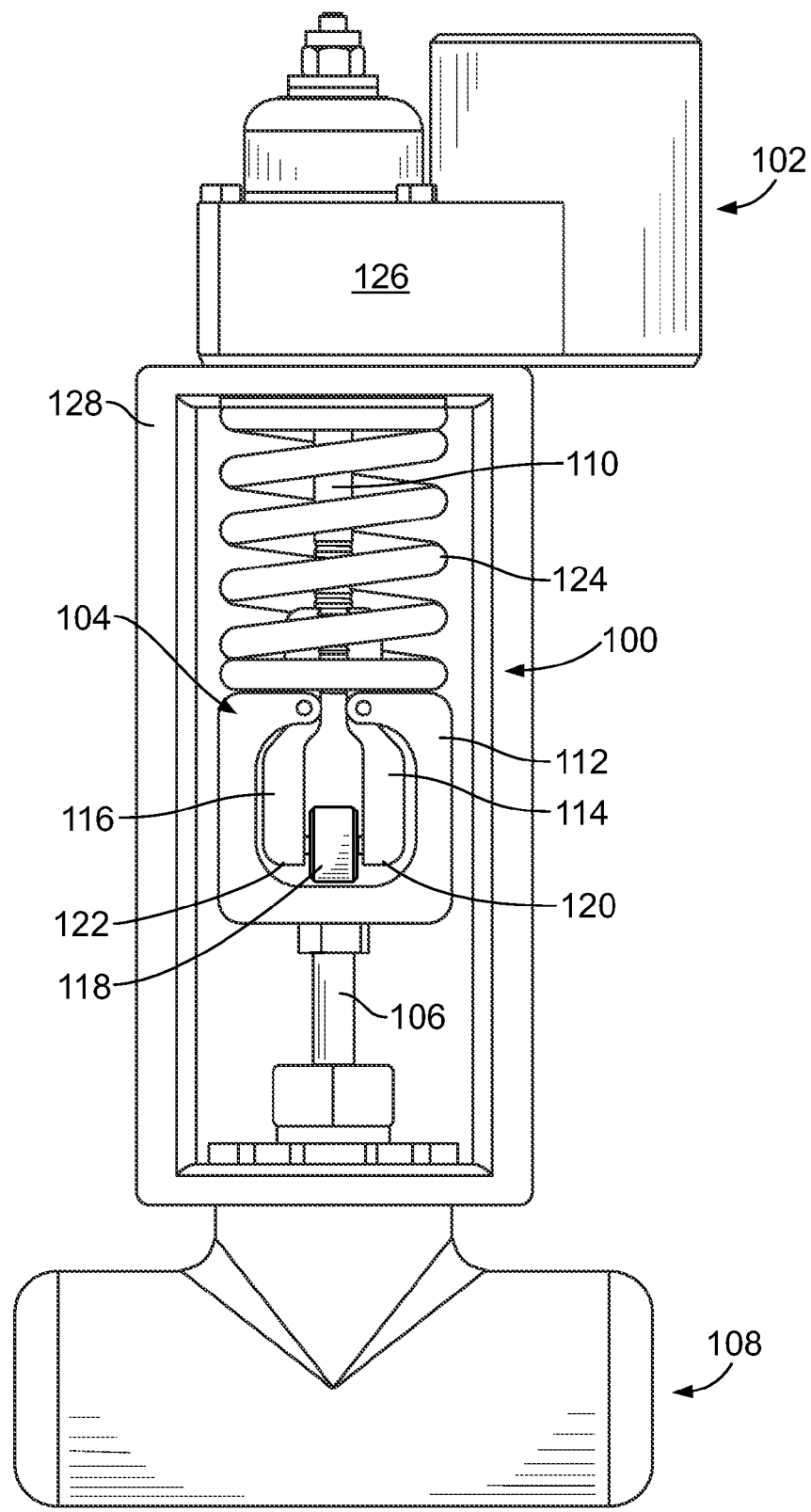
FIG. 1 depicts an example failsafe apparatus operatively coupling a stem of a device to a stem of a linear actuator.

While the following example failsafe apparatus for use with linear actuators are described in conjunction with electric linear actuators and valves, the example failsafe apparatus may also be used with any other linear actuators and any other devices (e.g., a damper). Electric linear actuators are often used to operate devices. For example, an electric linear actuator may be used to move a flow control member of a valve between a first position (e.g., an open position) and a second position (e.g., a closed position). The electric linear actuator may include an electric motor, a transmission (e.g., a gear train), and an actuator stem (e.g., a driveshaft). The actuator stem is typically rigidly coupled (e.g., via a nut) to a valve stem, which is coupled to the flow control member.

Occasionally, an electric linear actuator suffers a loss of electrical power. Without electrical power, the motor in the actuator seizes or maintains its last position, which arrests the movement of the actuator stem and may cause the flow control member to be suspended in an undesirable position. Therefore, backup power sources (e.g., batteries, capacitors, etc.) are often coupled to the electric motors of linear actuators. A backup power source typically provides the electric motor with temporary electrical power (e.g., to move the actuator stem to a failsafe position) until the electrical power outage is resolved. However, these backup power sources often fail without notice, have temperature limitations, and create ignition hazards.

Example failsafe apparatus for use with linear actuators described herein move a stem of a device operated by a linear actuator to a failsafe position (e.g., fully open, fully closed, etc.) without providing electrical power to the motor of the linear actuator. An example failsafe apparatus described herein includes a spring to urge a first stem of a device to be operated by a linear actuator toward a failsafe position and a clutch to operatively couple a second stem of the linear actuator to the first stem. The clutch includes a frame, and a first jaw and a second jaw are moveably coupled (e.g., pivotably coupled, slidably coupled, etc.) to the frame. The frame is coupled to one of the first stem or the second stem. The jaws engage the other one of first stem or the second stem to enable the linear actuator to operate the device and disengage the other one of the first stem or second stem to enable the spring to move the first stem toward the failsafe position. An actuator (e.g., a solenoid) may be positioned between respective ends of the jaws to urge the jaws into engagement with the other one of the first stem or the second stem. The clutch may also include a second spring to urge the jaws to disengage the other one of the first stem or the second stem. When the actuator stops urging the jaws to engage the other one of the first stem or the second stem, the second spring moves the jaws to disengage the jaws from the other one of the first stem or the second stem, and the spring urges the first stem to a failsafe position.

FIG. 1 depicts an example failsafe apparatus 100 for use with a linear actuator 102. The example failsafe apparatus 100 includes a clutch 104 to operatively couple a first stem 106 of a device 108 to be operated by the linear actuator 102 to a second stem 110 of the linear actuator 102. The linear actuator 102 may be an electric linear actuator including an electric motor (not shown) and a transmission (e.g., gear train) (not shown). The clutch 104 includes a frame 112. In the example depicted in FIG. 1, the frame 112 is coupled to the first stem 106 of the device 108. However, as described in greater detail below, the frame 112 may be coupled to the second stem 110 of the linear actuator 102 in some implementations of the example failsafe apparatus 100. In the illustrated example of FIG. 1, the device 108 is a valve 108. However, the example failsafe apparatus 100 may be used with other devices without departing from the scope of this disclosure. In FIG. 1, the first stem 106 is coupled to a flow control member (e.g., valve plug) (not shown) in the valve 108. A first jaw 114 and a second jaw 116 are moveably coupled (e.g., pivotably coupled, slidably coupled, etc.) to the frame 112. An actuator (e.g., a solenoid) 118 is positioned between respective ends 120 and 122 of the first jaw 114 and the second jaw 116. The jaws 114 and 116 in the example failsafe apparatus 100 shown in FIG. 1 are engaging the second stem 110 of the linear actuator 102. As described in greater detail below, the jaws 112 may engage the first stem 110 in some implementations of the example failsafe apparatus 100. In the example shown in FIG. 1, a spring 124 is compressed between a housing 126 of the linear actuator 102 and the frame 112 to urge the first stem 106 to a failsafe position, and the failsafe position of the illustrated example is a fully closed position. A hollow, cylindrical housing 128 is coupled to the housing 126 of the linear actuator 102 and the valve 108 to at least partially enclose the failsafe apparatus 100.

The failsafe position may alternatively be a fully open position. In that case, the example failsafe apparatus 100 may move the first stem 106 of the device 108 to an open failsafe position by configuring the spring 124 to be in tension and coupled to the frame 112 and the housing 126 of the linear actuator 102. Alternatively, the spring 124 may be compressed between the device 108 and the frame 112 to provide a fully open failsafe position. As described in greater detail below, in the example of FIG. 1, the jaws 114 and 116 engage the second stem 110 to enable the linear actuator 102 to operate the device 108 and disengage the second stem 110 to enable the spring 124 to move the first stem 106 toward the failsafe position.

Figure 2:
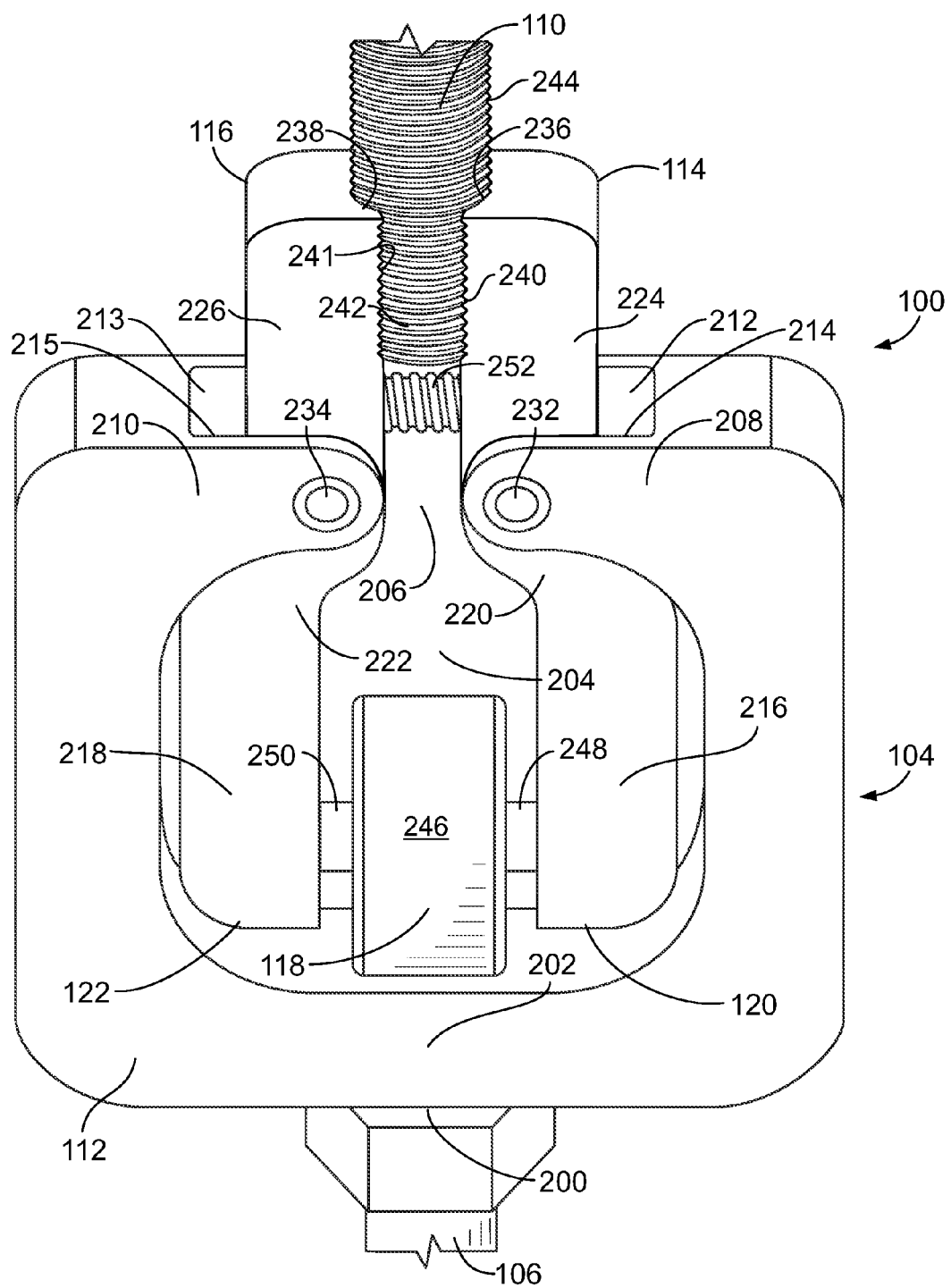
FIG. 2 depicts an enlarged view of the example failsafe apparatus of FIG. 1.

FIG. 2 depicts an enlarged view of the example failsafe apparatus 100 of FIG. 1. However, in FIG. 2, the spring 124 is not shown. The frame 112 is coupled to the first stem 106 at a midpoint 200 of a base 202 of the frame 112. The frame 112 defines a substantially square or rectangular aperture 204 that extends through the frame 112 in a direction perpendicular to the longitudinal axis of the first stem 106. A gap 206 equally divides the portion of the frame 112 opposite the base 202 to provide a first fulcrum portion 208 and a second fulcrum portion 210. Each fulcrum portion 208 and 210 includes a channel 212 and 213 adjacent the gap 206. The above-noted shape of the frame 112 is merely an example and, thus, other shapes may be used without departing from the scope of this disclosure.

The first jaw 114 and the second jaw 116 are each partially disposed in one of the channels 212 and 213 and moveably coupled to a pair of opposing walls 214 and 215. The jaws 114 and 116 depicted in FIG. 2 are each pivotably coupled to one pair of opposing walls 214 and 215. In some examples, the jaws 114 and 116 are each slidably coupled to one pair of opposing walls 214 and 215. The jaws 114 and 116 include respective lever portions 216 and 218. The lever portions 216 and 218 are adjacent to supporting portions 220 and 222. The supporting portions 220 and 222 are curved toward each other in the orientation of FIG. 2 and support the jaws 114 and 116 on the fulcrum portions 208 and 210 of the frame 112. Further, the jaws 114 and 116 include gripping portions 224 and 226 adjacent to the supporting portions 220 and 222. The longitudinal axes of the gripping portions 224 and 226 are substantially parallel to the longitudinal axis of the respective lever portions 216 and 218 of the jaws 114 and 116. The above-noted shape of each jaw 114 and 116 is merely one example and, thus, other shapes may be used without departing from the scope of this disclosure. As described in greater detail below, the jaws 114 and 116 are urged into engagement with the first or second stem 110 by the actuator 118 positioned between the ends 120 and 122 of the lever portions 216 and 218 of the jaws 114 and 116.

The lever portions 216 and 218 of the jaws 114 and 116 are disposed within the aperture 204, and the gripping portions 224 and 226 of the jaws 114 and 116 are at least partially disposed outside the frame 112 to engage the second stem 110. Each jaw 114 and 116 may be coupled to the frame 112 via respective pivot pins 232 and 234 passing through the fulcrum portions 208 and 210. The mechanical advantage of the jaws 114 and 116 may be affected by the position of the pivot pins 232 and 234 on the jaws 114 and 116. For example, the force needed to urge the jaws 114 and 116 into engagement with the second stem 110 may increase if the pivot pins 232 and 234 are positioned on the jaws 114 and 116 closer to the ends 120 and 122 of the jaws 114 and 116 than shown in FIG. 2.

Faces 236 and 238 of the gripping portions 224 and 226 of the jaws 114 and 116 face one another to enable the jaws 114 and 116 to grip the second stem 110 when the actuator 118 positioned between the ends 120 and 122 of the lever portions 216 and 218 urges the lever portions 216 and 218 outward and the faces 236 and 238 inward into engagement with the second stem 110. The faces 236 and 238 are concave or curved to substantially correspond to an outer curved surface 242 of the second stem 110. The faces 236 and 238 may include serrations 240 and 241 and/or friction material (not shown) to grip the second stem 110. The outer curved surface 242 of the second stem 110 may also include serrations 244 to engage the serrations 240 and 241 of the faces 238 and 238 and/or friction material to grip the jaws 114 and 116. The friction material may enable the second stem 110 to slip as needed within the grasp of the jaws 114 and 116 to dampen vibrations of the device 108.

The actuator 118 positioned between the ends 120 and 122 of the lever portions 216 and 218 of the jaws 114 and 116 in the example failsafe apparatus 100 shown in FIG. 2 is an electric linear solenoid 246. However, other example failsafe apparatus 100 may include actuators that are pneumatically powered. The solenoid 246 includes plungers 248 and 250, and each plunger 248 and 250 is pivotably coupled to one of the jaws 114 and 116. A second spring 252 is compressed between the jaws 114 and 116 to bias or urge the jaws 114 and 116 away from the second stem 110. As described in greater detail below, when electrical power is provided to the solenoid 246, the plungers 248 and 250 move away from a center of the solenoid 246 to urge the jaws 114 and 116 into engagement with the second stem 110.

FIG. 2 shows the jaws 114 and 116 of the example failsafe apparatus 100 engaging the second stem 110. During operation of the device 108, the solenoid 246 is provided with electrical power to cause the plungers 248 and 250 of the solenoid 246 to move away from a center of the solenoid 246. As a result, the plungers 248 and 250 urge the lever portion 216 and 218 of each jaw 114 and 116 away from the solenoid 246 to cause each of the jaws 114 and 116 to pivot about the respective pivot pin 232 and 234 and engage the second stem 110. When the jaws 114 and 116 engage the second stem 110, the serrations 240 and 241 of each face 236 and 238 engage the serrations 244 of the second stem 110. Once the jaws 114 and 116 engage the second stem 110, the linear actuator 102 may operate the device 108.

Figure 3:
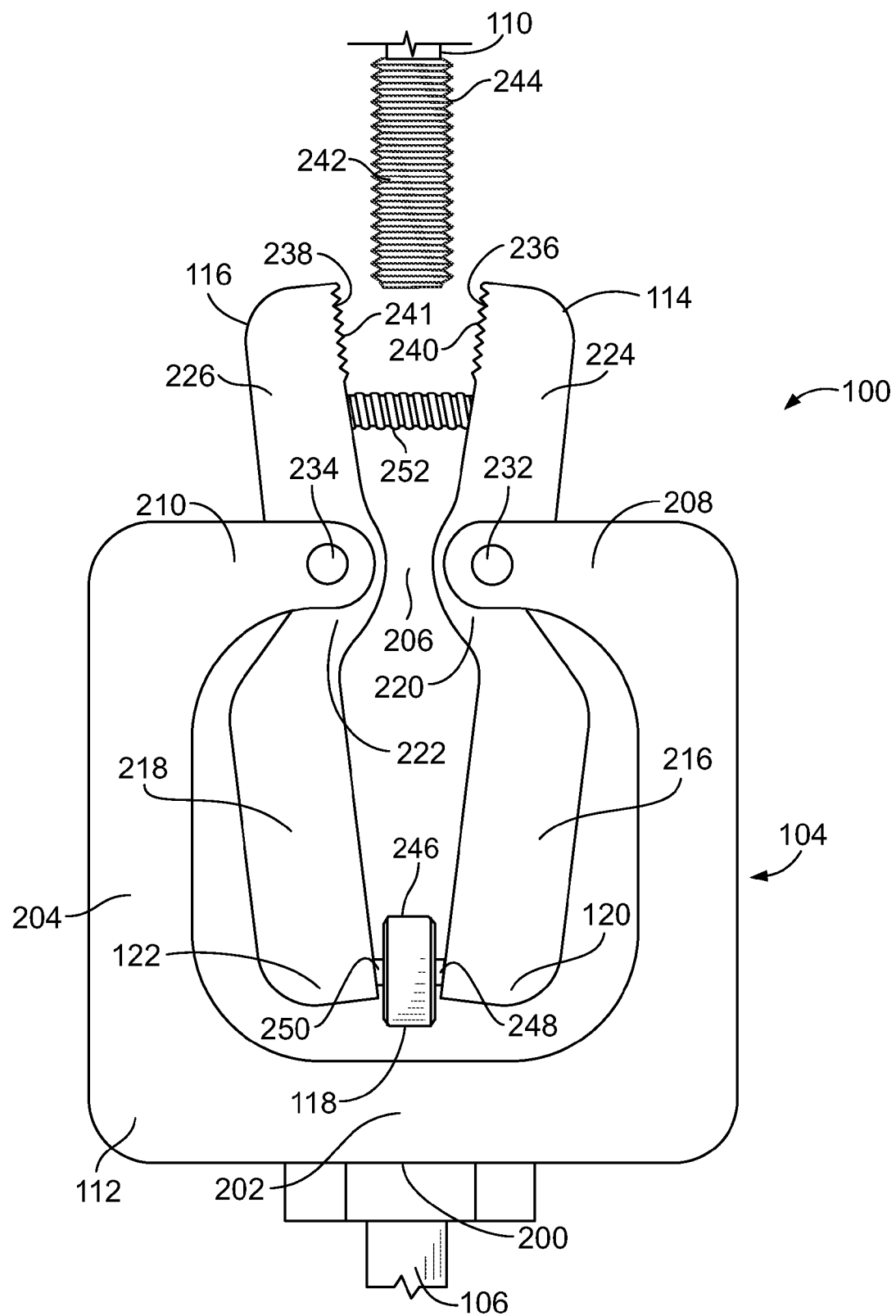
FIG. 3 illustrates the example failsafe apparatus of FIG. 1 in a failsafe position.

FIG. 3 shows the jaws 114 and 116 of the example failsafe apparatus 100 of FIGS. 1 and 2 disengaged from the second stem 110. The spring 124 to urge the first stem 106 to the failsafe position is not shown in FIG. 3. When electrical power to the linear actuator 102 is removed, the electric motor in the linear actuator 102 may hold the second stem 110 in its last position. At substantially the same time, electrical power to the solenoid 246 is removed to cause the plungers 248 and 250 of the solenoid 246 to stop urging the jaws 114 and 116 away from the solenoid 246 and into engagement with the second stem 110. The second spring 252 then causes the jaws 114 and 116 to disengage the second stem 110. Once the jaws 114 and 116 disengage the second stem 110, the spring 124 moves the first stem 106 to the failsafe position (e.g., fully closed position). In FIG. 3, the first stem 106 is in a fully closed failsafe position.

The example failsafe apparatus 100 may also move the first stem 106 toward a failsafe position in response to a decrease in electrical power. A sensor (not shown) may be coupled to a power source (not shown) to detect a value of the power provided by the power source to the linear actuator 102. The sensor may communicate the power value to a controller (not shown) connected to the solenoid 246. If the power supplied by the power source to the linear actuator 102 drops below a threshold level, the controller sends a signal to the solenoid 246 instructing the solenoid 246 to stop urging the jaws 114 and 118 into engagement with the second stem 110. As a result, the second spring 252 causes the jaws 114 and 116 to disengage the second stem 110, and the spring 124 moves the first stem 106 to a failsafe position.

When sufficient power is restored to the linear actuator 102, the second stem 110 may be moved to correspond to the failsafe position (e.g., fully open, fully closed, etc.) to align the serrations 244 of the second stem 110 with the serrations 240 and 241 of the jaws 114 and 116. Once the position of the second stem 110 corresponds to the failsafe position, power is restored to the solenoid 246 to urge the jaws 114 and 116 into engagement with the second stem 110. The linear actuator 102 may then operate the device 108.

Figure 4:
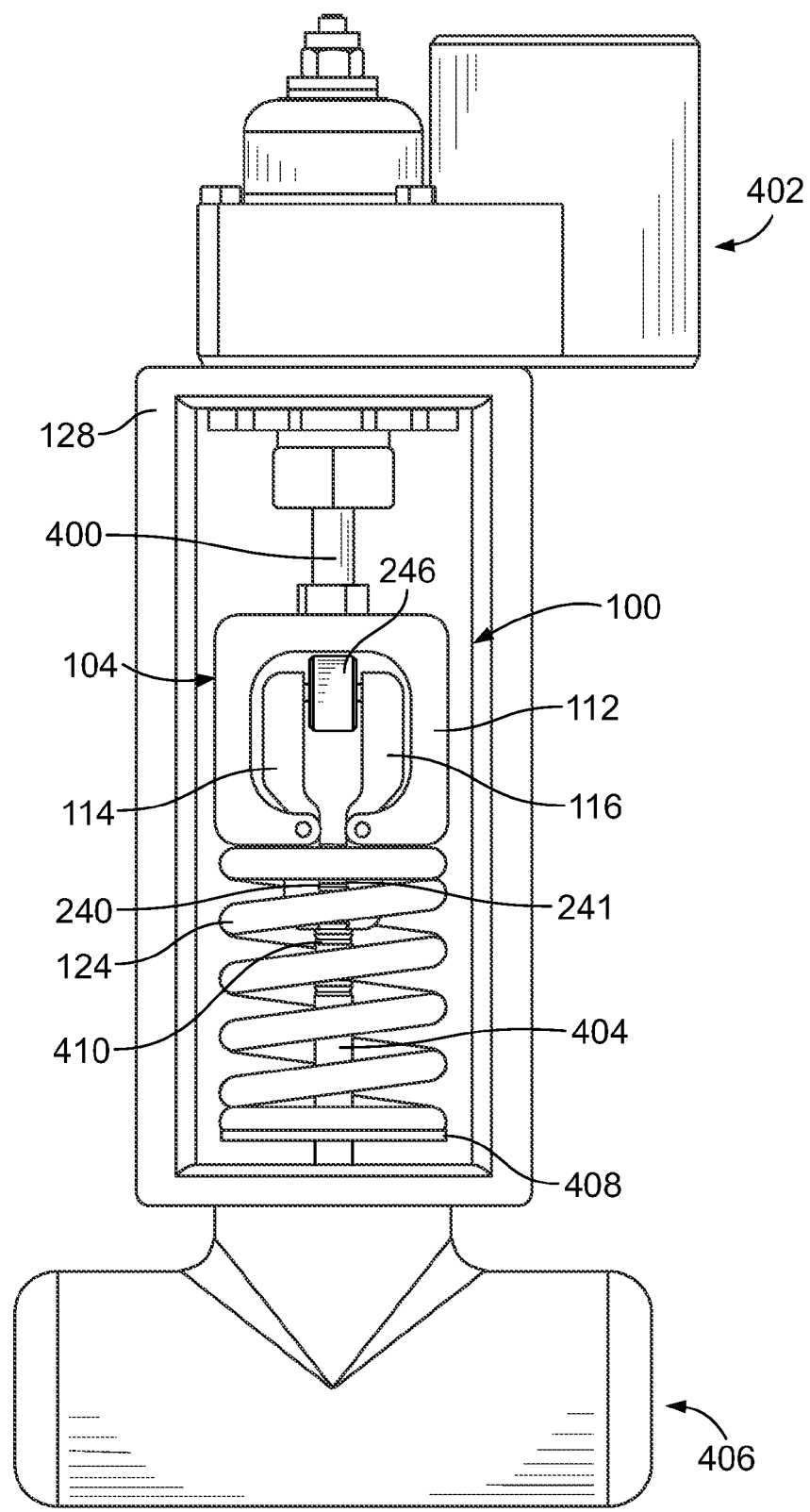
FIG. 4 depicts another example failsafe apparatus.
Figure 5:
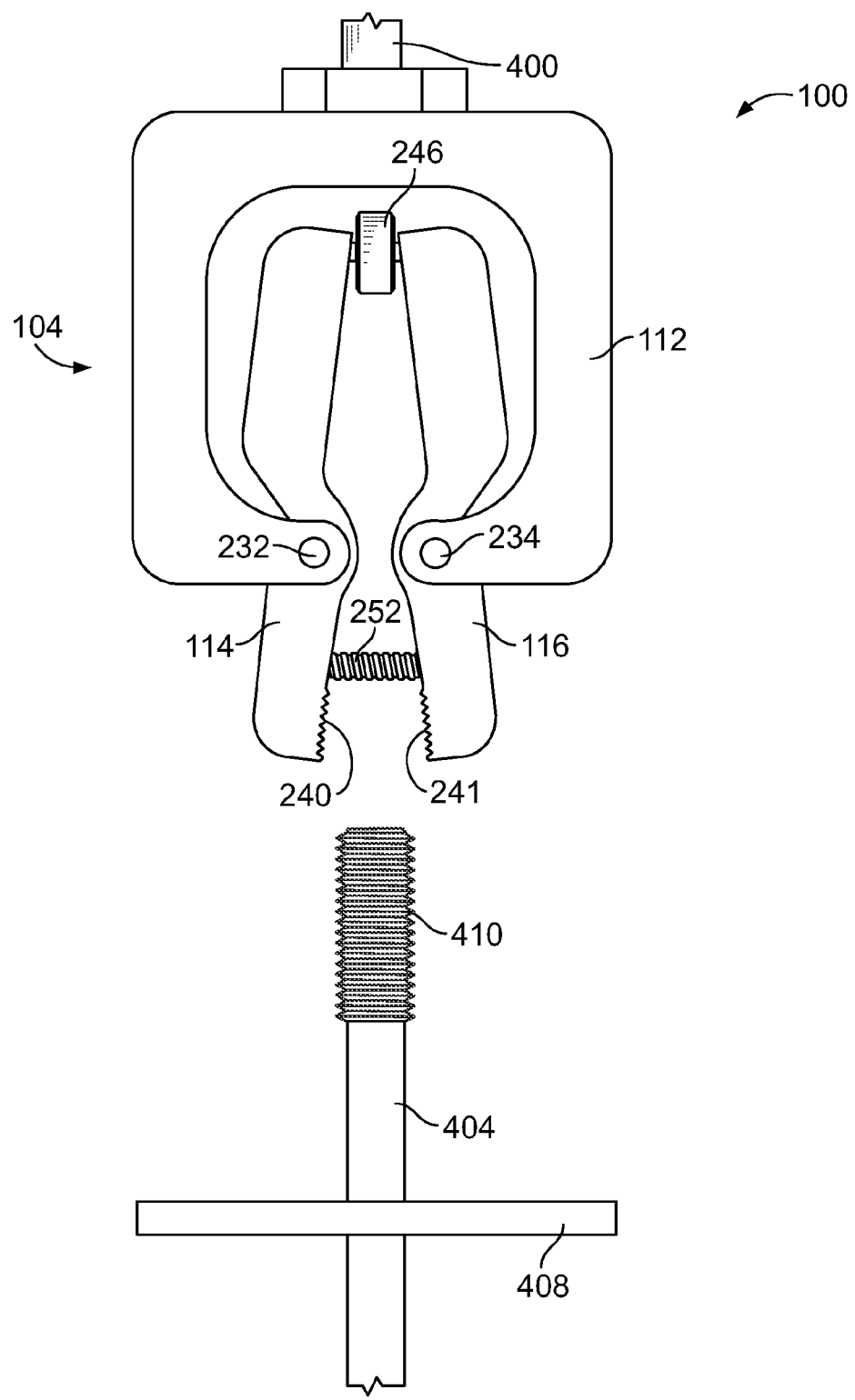
FIG. 5 illustrates the example failsafe apparatus of FIG. 4 in a failsafe position.

FIGS. 4 and 5 depict another implementation of the example failsafe apparatus 100. In the example failsafe apparatus 100 depicted in FIG. 4, the frame 112 is coupled to a second stem 400 of a linear actuator 402, and the solenoid 246 is to urge the jaws 114 and 116 into engagement with a first stem 404 of a device 406. The first stem 404 includes serrations 410 to grip the serrations 240 and 241 of the jaws 114 and 116. The first stem 404 also includes a seat 408. An example seat 408 may be a plate, a pin, or any suitable support for the spring 124. In the example of FIG. 4, the spring 124 is compressed between the frame 112 and the seat 408 to urge the first stem 404 toward a fully closed failsafe position. In some examples, the interior walls of the housing 128 may include protrusions to support the spring 124, and the spring 124 may be compressed between the protrusions and the seat 408 to urge the first stem 404 toward the fully closed failsafe position. In some examples, the spring 124 may be in tension between the seat 408 and the device 406 to urge the first stem 404 toward the fully closed failsafe position.

FIG. 5 depicts the jaws 114 and 116 of the example failsafe apparatus 100 disengaged from the first stem 404. As a result, the spring 124 (not shown) moves the first stem 404 downward in the orientation of FIG. 5. Thus, the first stem 404 in the example of FIG. 5 is in a fully closed failsafe position.

The failsafe apparatus 100 depicted in FIGS. 4 and 5 may also move the first stem 404 toward a fully open failsafe position. In such examples, the spring 124 is compressed between the device 406 and the seat 408 to urge the seat 408 and, thus, the first stem 404 toward the fully open failsafe position. In some other examples, the spring 124 is in tension between the frame 112 and the seat 408 to urge the first stem 404 toward the fully open failsafe position.

Although certain example apparatus have been described herein, the scope of coverage of this patent is not limited thereto. On the contrary, this patent covers all apparatus fairly falling within the scope of the claims of this patent.

What is claimed is:

1. A failsafe apparatus for use with a linear actuator, comprising:
   a first stem of a device to be operated by the linear actuator;
   a second stem of the linear actuator;
   a first jaw and a second jaw, the jaws to move toward each other to operatively couple the first stem and the second stem;
   a first spring to urge the first stem toward a failsafe position; and
   a second spring positioned between the jaws to urge the jaws away from each other,
   wherein, when the second spring moves the jaws away from each other, the first stem and the second stem are to decouple and the first spring is to move the first stem to the failsafe position.

2. The failsafe apparatus of claim 1, further comprising an actuator positioned between the jaws to urge the jaws to couple the first stem and the second stem.

3. The failsafe apparatus of claim 2, wherein the actuator is a solenoid.

4. The failsafe apparatus of claim 1, wherein the jaws include serrations.

5. The failsafe apparatus of claim 4, wherein one of the first stem or the second stem includes serrations to engage the serrations of the jaws.

6. The failsafe apparatus of claim 4, wherein the second spring is adjacent the serrations.

7. The failsafe apparatus of claim 1, wherein the jaws include friction material.

8. The failsafe apparatus of claim 1, wherein the failsafe position is a fully closed position or a fully open position of the device.

9. The failsafe apparatus of claim 1, wherein the linear actuator is an electric linear actuator and the device is a valve.

10. A failsafe apparatus for use with a linear actuator, comprising:
    a first spring to urge a first stem of a device to be operated by the linear actuator toward a failsafe position; and
    a clutch to operatively couple a second stem of the linear actuator to the first stem, wherein the clutch includes jaws to engage one of the first stem or the second stem to enable the linear actuator to linearly move the first stem and the second stem to operate the device;
    a second spring positioned between the jaws to urge the jaws away from each other, wherein, when the second spring moves the jaws away from each other, the jaws are to disengage the one of the first stem or the second stem to enable the first spring to move the first stem toward the failsafe position and relative to the second stem.

11. The failsafe apparatus of claim 10, further comprising an actuator positioned between the jaws to urge the jaws into engagement.

12. The failsafe apparatus of claim 11, wherein the actuator is a solenoid.

13. The failsafe apparatus of claim 10, wherein the jaws include serrations.

14. The failsafe apparatus of claim 13, wherein the one of the first stem or the second stem includes serrations to engage the serrations of the jaws.

15. The failsafe apparatus of claim 13, wherein the second spring is compressed between the jaws when the first stem and the second stem are operatively coupled.

16. The failsafe apparatus of claim 10, wherein the jaws include friction material.

17. The failsafe apparatus of claim 10, wherein the failsafe position is a fully closed position or a fully open position of the device.

18. The failsafe apparatus of claim 10, wherein the linear actuator is an electric linear actuator and the device is a valve.

19. A failsafe apparatus for use with a linear actuator, comprising:

first means for urging a first stem of a device to be operated by the linear actuator toward a failsafe position; and means for operatively coupling a second stem of the linear actuator to the first stem, wherein the means for operatively coupling includes means for engaging, the means for engaging to couple the first stem and the second stem to enable the linear actuator to operate the devices; and second means for urging positioned between the means for engaging to urge the means for engaging to disengage, wherein, when the second means for urging causes the means for engaging to disengage, the first stem and the second stem are to decouple and the first means for urging is to move the first stem toward the failsafe position.

20. The failsafe apparatus of claim 19, further comprising third means for urging positioned between the means for engaging to urge the means for engaging to couple the first stem and second stem.

* * * * *

UNITED STATES PATENT AND TRADEMARK OFFICE
CERTIFICATE OF CORRECTION

| | | |
|---|---|---|
| PATENT NO. | : 8,979,063 B2 | Page 1 of 1 |
| APPLICATION NO. | : 13/305115 | |
| DATED | : March 17, 2015 | |
| INVENTOR(S) | : Ross Arthur Schade | |

It is certified that error appears in the above-identified patent and that said Letters Patent is hereby corrected as shown below:

IN THE CLAIMS:

In Column 8, line 7 (Claim 19): Replace "devices" with --device--

Signed and Sealed this
Fourteenth Day of July, 2015

Michelle K. Lee
*Director of the United States Patent and Trademark Office*